(12) United States Patent
Mishima et al.

(10) Patent No.: US 12,154,772 B2
(45) Date of Patent: Nov. 26, 2024

(54) IMAGING MASS SPECTROMETER

(71) Applicant: SHIMADZU CORPORATION, Kyoto (JP)

(72) Inventors: Kenichi Mishima, Kyoto (JP); Kengo Takeshita, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 291 days.

(21) Appl. No.: 17/641,662

(22) PCT Filed: Sep. 29, 2020

(86) PCT No.: PCT/JP2020/036855
§ 371 (c)(1),
(2) Date: Mar. 9, 2022

(87) PCT Pub. No.: WO2021/075254
PCT Pub. Date: Apr. 22, 2021

(65) Prior Publication Data
US 2022/0326181 A1 Oct. 13, 2022

(30) Foreign Application Priority Data
Oct. 16, 2019 (JP) .............................. 2019-189191

(51) Int. Cl.
*H01J 49/16* (2006.01)
*H01J 49/00* (2006.01)
*G01N 27/623* (2021.01)

(52) U.S. Cl.
CPC ........ *H01J 49/0004* (2013.01); *H01J 49/161* (2013.01); *G01N 27/623* (2021.01)

(58) Field of Classification Search
CPC ..... G01N 27/623; G01N 27/64; H01J 49/161; H01J 49/164; H01J 49/0004
See application file for complete search history.

(56) References Cited

U.S. PATENT DOCUMENTS

2016/0027625 A1 1/2016 Brown et al.
2019/0115200 A1* 4/2019 Harada .............. H01J 49/0418
2019/0272984 A1 9/2019 Takeshita et al.

FOREIGN PATENT DOCUMENTS

CN 104254426 A 12/2014
CN 109073593 A 12/2018
(Continued)

OTHER PUBLICATIONS

JP-2007257851-A, machine translation (Year: 2007).*
(Continued)

*Primary Examiner* — Michael J Logie
(74) *Attorney, Agent, or Firm* — Sughrue Mion, PLLC

(57) ABSTRACT

The present invention provides an imaging mass spectrometer which generates ions by irradiating a sample with a laser beam and performs mass spectrometry of the ions, the imaging mass spectrometer including: a laser irradiation unit 30 configured to emit the laser beam toward the sample, a condensing optical system 33 disposed between the laser irradiation unit 30 and the sample and configured to condense the laser beam emitted from the laser irradiation unit 30, an image acquiring unit 40 configured to acquire a condensing state checking image which is an optical microscopic image capable of checking a condensing state on the sample of the laser beam emitted from the laser irradiation unit 30, and a display unit 64 configured to display the condensing state checking image acquired by the image acquiring unit 40 on a display screen.

3 Claims, 3 Drawing Sheets

(56) References Cited

FOREIGN PATENT DOCUMENTS

| | | | |
|---|---|---|---|
| EP | 2 815 838 A1 | 12/2014 | |
| EP | 3 447 485 A1 | 2/2019 | |
| JP | 2007257851 A * | 10/2007 | |
| JP | 2012133935 A * | 7/2012 | |
| JP | 2016-513797 A | 5/2016 | |
| WO | 2007/097023 A1 | 8/2007 | |
| WO | 2014/174659 A1 | 10/2014 | |
| WO | WO-2017183086 A1 * | 10/2017 | ............ G01N 27/62 |
| WO | 2018/037491 A1 | 3/2018 | |

OTHER PUBLICATIONS

JP-2012133935-A, machine translation (Year: 2012).*
Chinese Office Action dated Mar. 4, 2024 in Application No. 202080067563.6.
Notice of Allowance dated Dec. 20, 2022 issued for the corresponding Japanese Patent Application No. 2021-552300.
Takahiro Harada et al., "Kenbi Shitsuryou Bunseki Souchi Ni Yoru Seitai Soshiki Bunseki", ("Biological Tissue Analysis Using Mass Microscope"), Shimadzu Review, issued on Apr. 24, 2008, pp. 139-145, vol. 64, Nos. 3•4.
International Search Report of PCT/JP2020/036855 dated Dec. 22, 2020 [PCT/ISA/210].
Written Opinion of PCT/JP2020/036855 dated Dec. 22, 2020 [PCT/ISA/237].
Office Action issued Sep. 10, 2024 in Chinese Application No. 202080067563.6.

* cited by examiner

IMAGING MASS SPECTROMETER

CROSS REFERENCE TO RELATED APPLICATIONS

This application is a National Stage of International Application No. PCT/JP2020/036855, filed Sep. 29, 2020, claiming priority to Japanese Patent Application No. 2019-189191, filed Oct. 16, 2019.

TECHNICAL FIELD

The present invention relates to an imaging mass spectrometer.

BACKGROUND ART

A mass spectrometry imaging method is a technique for investigating the distribution of a substance having a specific mass by performing mass spectrometry on each of a plurality of measurement points within a two-dimensional area on a sample, such as a piece of biological tissue. A mass spectrometer that performs the mass spectrometry imaging method is generally called an imaging mass spectrometer (see Patent Document 1 and Non Patent Literature 1). Usually, microscopic observation is performed on an area on the sample, an analysis target region is decided based on the microscopic observation image, and the imaging mass spectrometry of the analysis target region is performed. Consequently, the imaging mass spectrometer may also be called a microscopic mass spectrometer or a mass microscope. It is referred to as "imaging mass spectrometer" in the present description.

An ion source in which a laser desorption ionization (LDI) method or a matrix assisted laser desorption ionization (MALDI) method is adopted is typically used in the imaging mass spectrometer. In the ion source in which the LDI method or MALDI method is adopted, a surface of the sample is irradiated with the laser beam in which the diameter is narrowed by a condensing optical system including a lens, and ions derived from the substance contained in the sample are generated around the laser beam irradiation region. The generated ions are extracted from the surface of the sample by action of an electric field, introduced to a mass spectrometer through an ion transport optical system or the like, and separated and detected according to a mass-to-charge ratio.

One of measurement modes (methods of use) of the imaging mass spectrometer is a method for obtaining an image representing an intensity distribution of ions having a certain mass-to-charge ratio on the sample by relatively moving an irradiation position of laser beam on the sample. In this method, for example, when the target sample is a cell as small as about several tens μm, a substance distribution image in the cell is obtained by narrowing the irradiation diameter of the laser beam to about 0.5 μm. That is, the diameter (irradiation diameter) of the laser beam with which the sample is irradiated becomes spatial resolution of an imaging analyzer.

CITATION LIST

Patent Literature

Patent Literature 1: WO 2018/037491 A

Non Patent Literature

Non Patent Literature 1: Harada and eight others, "Kenbi shitsuryou Bunseki Souchi Ni Yoru Seitai Soshiki Bunseki," ("Biological Tissue Analysis Using Mass Microscope"), Shimadzu Review, Vol. 64, Nos. 3.4, issued on Apr. 24, 2008, pp. 139-145

SUMMARY OF INVENTION

Technical Problem

Whether the irradiation diameter of the laser beam is correctly set is important for determining the spatial resolution of the imaging mass spectrometer. The irradiation diameter of the laser beam is obtained by, for example, irradiating a sample in which a predetermined pigment is uniformly applied to a surface of a slide glass with the laser beam, and measuring the size of the mark (irradiation mark) formed by ablation scattering of the pigment. A special jig or measuring instrument using a knife edge method is required to measure the diameter of the irradiation mark. For this reason, conventionally, whether the irradiation diameter of the laser beam is correctly set cannot be checked by a user, but can be checked only by a service person at a time of inspection before shipment of the imaging mass spectrometer or at a time of maintenance, repair, or the like performed at an appropriate timing after shipment.

An object of the present invention is to enable the user of the imaging mass spectrometer to easily check a condensing state of the laser beam.

Solution to Problem

The present invention made to solve the above problems is an imaging mass spectrometer which generates ions by irradiating a sample with a laser beam and performs mass spectrometry of the ions, the imaging mass spectrometer including: a laser irradiation unit configured to emit the laser beam toward the sample; a condensing optical system disposed between the laser irradiation unit and the sample and configured to condense the laser beam emitted from the laser irradiation unit;

an image acquiring unit configured to acquire a condensing state checking image which is an optical microscopic image capable of checking a condensing state on the sample of the laser beam emitted from the laser irradiation unit; and a display unit configured to display the condensing state checking image acquired by the image acquiring unit on a display screen.

Advantageous Effects of Invention

In the imaging mass spectrometer according to an aspect of the present invention, the user can easily check whether the condensing state of the laser beam emitted from the laser irradiation unit is a desired state by viewing the condensing state checking image displayed on the display screen.

DESCRIPTION OF EMBODIMENTS

Hereinafter, an imaging mass spectrometer according to one embodiment of the present invention will be described with reference to the accompanying drawings.

Figure 1:
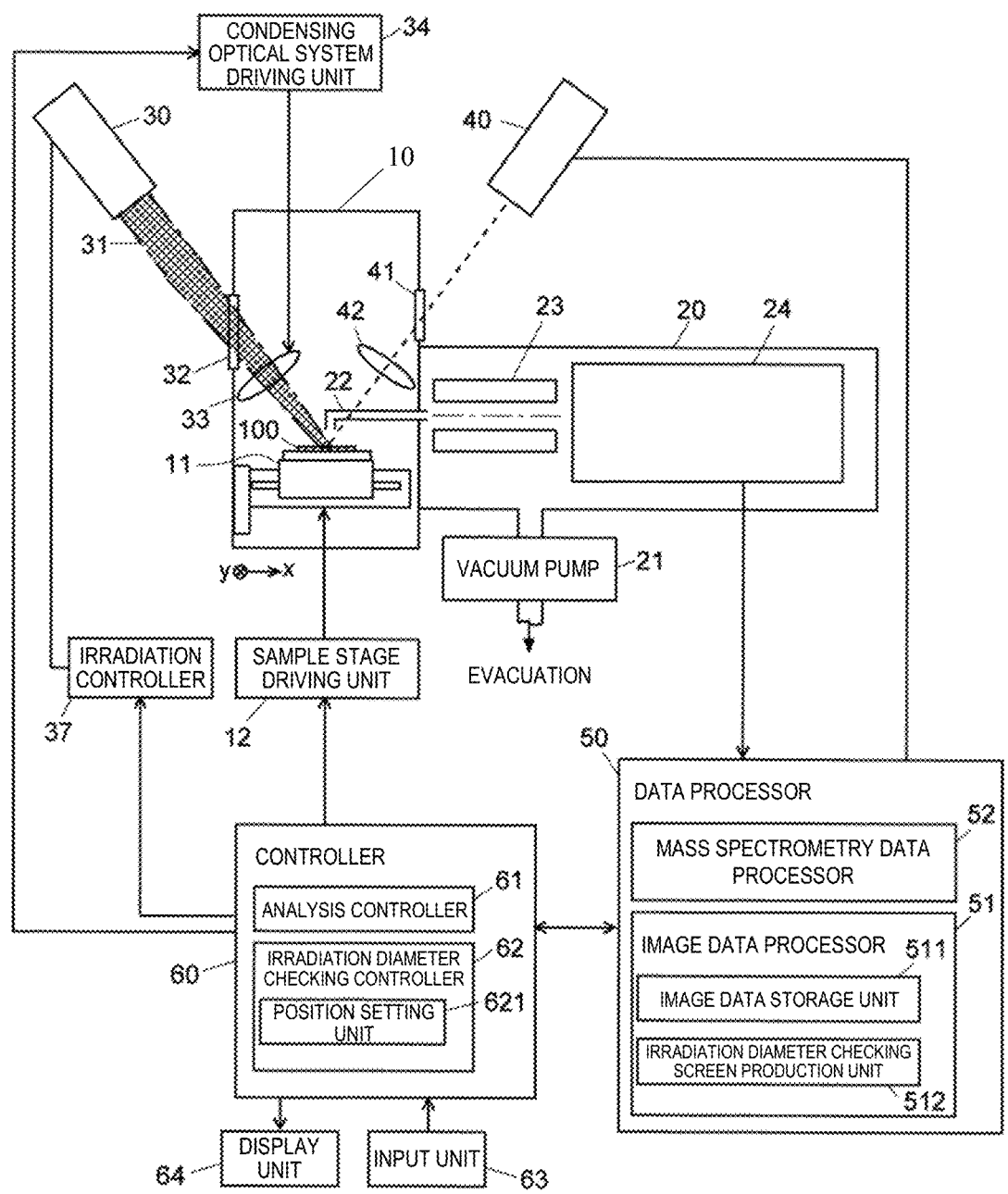
FIG. 1 is a schematic configuration diagram illustrating an imaging mass spectrometer according to an embodiment of the present invention.

FIG. 1 is a schematic configuration diagram illustrating the imaging mass spectrometer of the present embodiment. The imaging mass spectrometer uses an atmospheric pressure matrix-assisted laser desorption ionization (AP-MALDI) method or an atmospheric pressure laser desorption/ionization (AP-LDI) method as an ionization method, and includes an ionization chamber 10 maintained at a substantially atmospheric pressure atmosphere and a vacuum chamber 20 evacuated by a vacuum pump 21.

A sample stage 11 on which a sample 100 to be analyzed is placed is disposed in the ionization chamber 10. The sample stage 11 is configured so as to be movable in two axial directions of an X-axis and a Y-axis orthogonal to each other by driving force from a sample stage driving unit 12 including a motor. The sample stage driving unit 12 corresponds to the irradiation position moving unit of the present invention. For example, the sample 100 is a tissue section cut out very thin from a living tissue, and is prepared as an MALDI sample by applying or spraying a proper matrix onto the sample 100.

A laser irradiation unit 30 and an image acquiring unit 40 are disposed outside the ionization chamber 10. The laser irradiation unit 30 emits a laser beam 31 ionizing a substance in the sample 100. The laser beam 31 emitted from the laser irradiation unit 30 is applied to the surface of the sample 100 through an irradiation window 32 and a condensing optical system 33 provided on a side surface of the ionization chamber 10. The condensing optical system 33 is movable in a predetermined range in an optical axis direction of the laser beam 31 by a condensing optical system driving unit 34.

The image acquiring unit 40 includes, for example, a CCD camera, and photographs a predetermined range of the sample 100 placed on the sample stage 11 through a photographing window 41 and a photographing optical system 42 provided on the side surface of the ionization chamber 10. An imaging signal obtained by the image acquiring unit 40 is transmitted to a data processor 50, an image data processor 51 executes appropriate data processing, and the imaging signal is converted into optical microscopic image data. The optical microscopic image data is stored in an image data storage unit 511 as necessary. In addition, an irradiation diameter checking screen production unit 512 produces an irradiation diameter checking screen from the optical microscopic image data stored in the image data storage unit 511. The data of the irradiation diameter checking screen is also stored in the image data storage unit 511. The irradiation diameter checking screen will be described later.

An entrance end of an ion transport pipe 22 that communicates the ionization chamber 10 and the vacuum chamber 20 is open immediately above the laser beam irradiation position of the sample 100. An ion transport optical system 23 and an ion separation and detection unit 24 are installed in the vacuum chamber 20. The ion transport optical system 23 transports ions while converging the ions by action of an electric field. The ion separation and detection unit 24 includes a mass spectrometer that separates the ions according to a mass-to-charge ratio and a detector that detects the separated ions. An ion intensity signal obtained by the ion separation and detection unit 24 is input to the data processor 50, and a mass spectrometry data processor 52 included in the data processor 50 executes appropriate data processing, so that, for example, a two-dimensional substance distribution image is produced.

For example, an electrostatic electromagnetic lens, a multipole type high-frequency ion guide, or a combination of the electrostatic electromagnetic lens and the multipole type radio-frequency ion guide is used as the ion transport optical system 23. For example, a quadrupole mass filter, a linear ion trap, a three-dimensional quadrupole ion trap, an orthogonal acceleration time-of-flight mass spectrometer, a Fourier transform ion cyclotron mass spectrometer, or a magnetic field sector type mass spectrometer is used as the mass spectrometer of the ion separation and detection unit 24.

A controller 60 includes an analysis controller 61 and an irradiation diameter checking controller 62. An input unit 63 and a display unit 64 are connected to the controller 60.

Functions of at least some of the data processor 50 and the controller 60 can be achieved by operating dedicated control and processing software installed on a personal computer (or higher-performance work station) including a CPU, a RAM, and a ROM as a hardware resource.

In response to an instruction from the input unit 63, the analysis controller 61 controls operations of the sample stage driving unit 12, an irradiation controller 37, the condensing optical system driving unit 34, the ion transport optical system 23, the ion separation and detection unit 24, and the like, and performs the mass spectrometry on the sample 100. Specifically, the analysis controller 61 causes the laser irradiation unit 30 to emit the laser beam 31 toward the sample 100 placed on the sample stage 11 through the irradiation controller 37. Thus, components existing at the region (measurement point) irradiated with the laser beam 31 on the sample 100 are ionized. The ionized components are transported into the vacuum chamber 20 through the ion transport pipe 22, and the mass spectrometry is performed. In addition, the analysis controller 61 moves the sample stage 11 in the X-Y plane through the sample stage driving unit 12. Thus, the position irradiated with the laser beam 31 on the sample 100 is moved, and the laser beam irradiation position on the sample 100 is scanned. As a result, the mass spectrometry is performed on a plurality of measurement points in a two-dimensional region on the sample 100. A detection signal obtained as a result of performing the mass spectrometry is sent to the data processor 50, and the mass spectrometry data processor 52 performs the predetermined data processing. A result of the data processing performed by the mass spectrometry data processor 52 is input to the controller 60 and output to the display unit 64.

In addition, the irradiation diameter checking controller 62 controls the operations of the sample stage driving unit 12, the irradiation controller 37, and the condensing optical system driving unit 34 in response to an instruction from the input unit 63, and executes the operation of checking the laser beam irradiation diameter with respect to the sample 100.

In the imaging mass spectrometer, the laser beam 31 emitted from the laser irradiation unit 30 is converged by the condensing optical system 33, and then applied to the surface of the sample 100. At this point, the condensing optical system 33 is disposed such that the diameter (laser irradiation diameter) of the laser beam 31 applied to the surface of the sample 100 has a predetermined size. In general, the condensing optical system 33 is disposed such that the surface of the sample comes to a position where the laser beam 31 is most condensed, namely, a position where the laser irradiation diameter is minimized, but the present invention is not limited to the position where the laser irradiation diameter is minimized. The position of the condensing optical system 33 when the laser irradiation diameter has a desired size is determined by a focal distance of the condensing optical system 33. Accordingly, the distance from the surface of the sample 100 to the condensing optical system 33 is originally adjusted such that the laser irradiation diameter becomes a predetermined size, but sometimes the disposition of the sample stage 11 and the condensing optical system 33 is shifted due to disturbance or the like. A gap of the disposition of the sample stage 11 and the condensing optical system 33 affects the size of the laser irradiation diameter even when the gap is slight. Accordingly, in the embodiment, under the instruction of the irradiation diameter checking controller 62, a predetermined region on the sample is irradiated with the laser beam 31, and an optical microscopic image of the checking region at that time is displayed on the display unit 64. The optical microscopic image displayed in the checking region corresponds to the condensing state checking image of the present invention.

When the optical microscopic image of the checking region is displayed on the display unit 64, the user prepares the sample in which a predetermined pigment is uniformly applied to the surface of a slide glass, and sets the sample on the sample stage 11. Subsequently, when the user of the imaging mass spectrometer instructs execution of an irradiation diameter checking operation from the input unit 63, the irradiation diameter checking controller 62 designates one or a plurality of checking regions on the sample 100.

The irradiation diameter checking controller 62 stores the size and position of the checking region according to the number of specified checking regions and the position of the condensing optical system 33 when each checking region is irradiated with the laser beam, and the irradiation diameter checking controller 62 moves the sample stage 11 through the sample stage driving unit 12 such that the irradiation position of the laser beam moves with a step width according to the size and position of the checking region. In addition, the condensing optical system 33 is moved through the condensing optical system driving unit 34 so as to be positioned as set for the checking region. Then, the laser irradiation unit 30 is driven through the irradiation controller 37 to emit the laser beam in a pulsed manner. When the sample surface is irradiated with the laser beam, the pigment is scattered due to ablation, and a mark (irradiation mark) irradiated with the laser beam can be formed.

Figure 2:
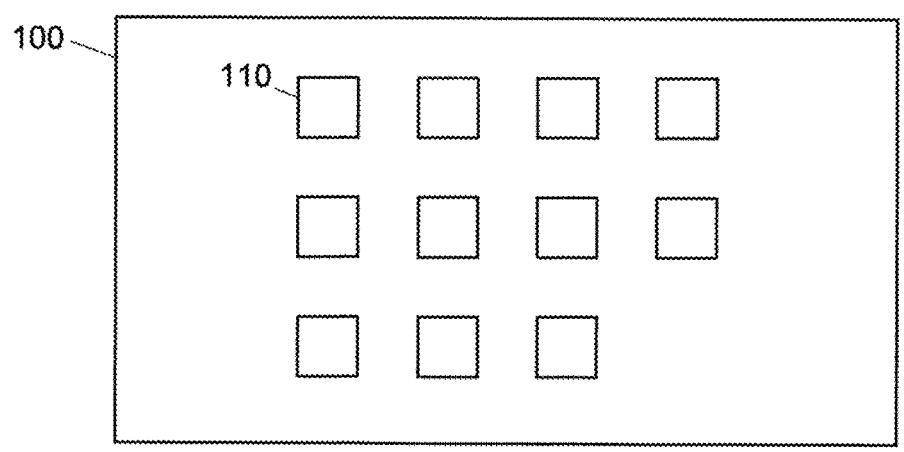
FIG. 2 is a view illustrating an example of a checking region set on a sample.

For example, FIG. 2 illustrates a plurality of checking regions 110 designated on the sample 100. FIG. 2 illustrates an example in which 11 rectangular checking regions 110 are designated on the sample 100, but the shape, number, size, and the like of the checking regions 110 are not limited to the example in FIG. 2. Furthermore, the laser irradiation unit 30 may irradiate each of the checking regions 110 with the laser beam only once, or irradiate a plurality of different places in each of the checking regions 110 with the laser beam once (that is, each checking region is irradiated with the laser beam a plurality of times).

When the operation of irradiating each checking region 110 on the sample 100 with the laser beam is completed, the irradiation diameter checking controller 62 causes the image acquiring unit 40 to acquire the optical microscopic image of the surface of the sample 100 including the checking region 110. The optical microscopic image acquired by the image acquiring unit 40 is sent to the image data processor 51 of the data processor 50, and appropriate data processing is performed to produce the optical microscopic image data. The produced optical microscopic image data is stored in the image data storage unit 511 in association with the position information of the condensing optical system 33 set in the checking region 110.

When the operation of irradiating all the checking regions 110 on the sample 100 with the laser beam and the operation of acquiring the optical microscopic image of the surface of the sample 100 including the checking region 110 are completed, the irradiation diameter checking controller 62 reads the optical microscopic image data of each checking region 110 from the image data storage unit 511, produces the irradiation diameter checking screen, and outputs the irradiation diameter checking screen to the display unit 64.

Figure 3:
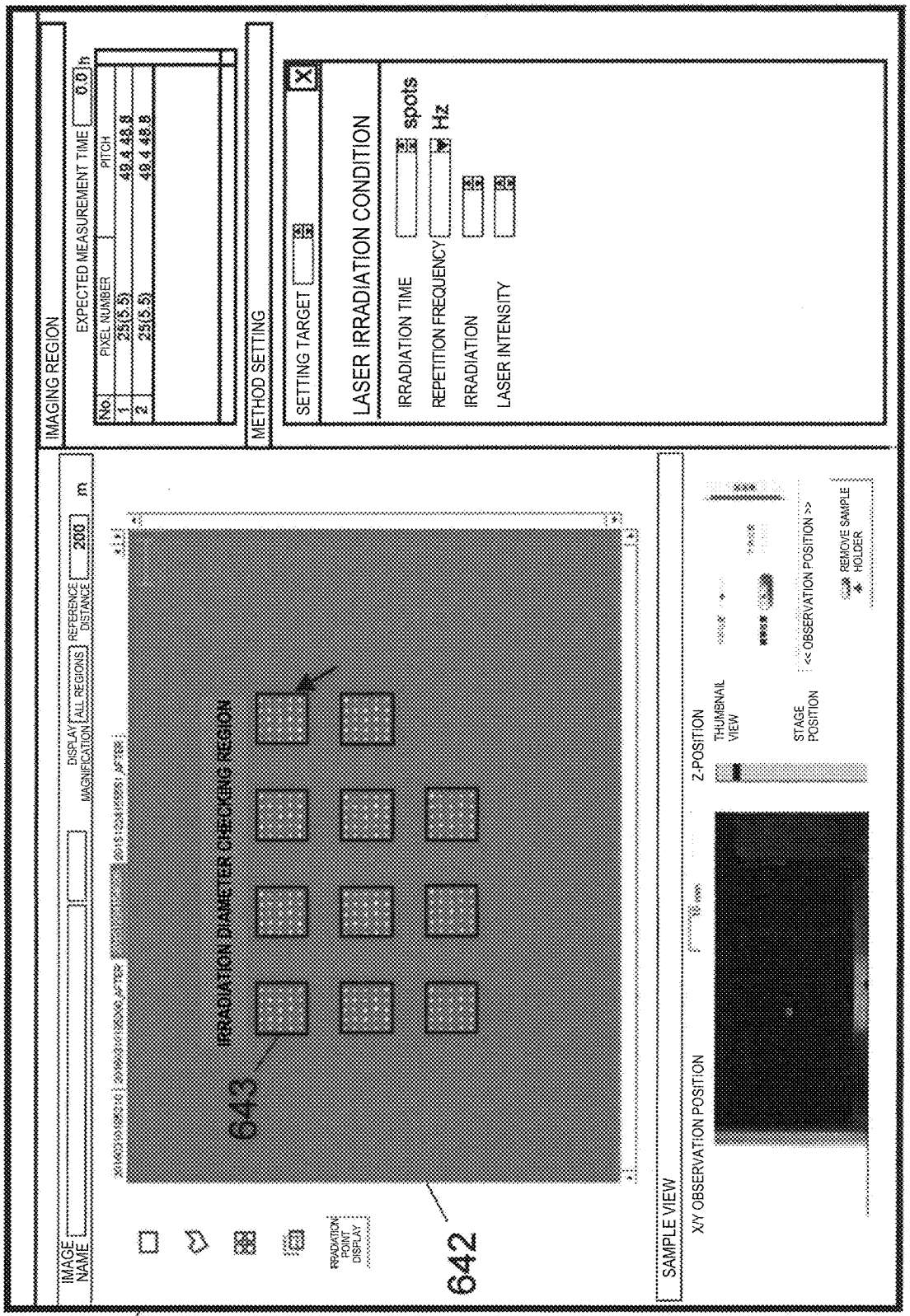
FIG. 3 is a view illustrating an example of an irradiation diameter checking screen displayed on a display screen.

FIG. 3 illustrates an example of an irradiation diameter checking screen 642 displayed on a display screen 641 of the display unit 64. In the embodiment, optical microscopic images 643 of the sample surface including 11 checking regions are displayed side by side on the irradiation diameter checking screen 642. The user views these optical microscopic images 643, and determines the checking region where the irradiation mark of the laser beam is in a desired state as the determined checking region. For example, the determination of the determined checking region can be performed by moving a cursor on the display screen 641 close to a desired checking region using a mouse and performing a click operation. In this example, the mouse serves as the selection operation unit.

When the determined checking region is selected, the irradiation diameter checking controller 62 reads the position of the condensing optical system 33 from the image data storage unit 511 in irradiating the determined checking region with the laser beam 31, and sets the position in the position setting unit 621. The condensing optical system 33 set in the position setting unit 621 can be the position of the condensing optical system 33 at the time of the next mass spectrometry.

The present invention is not limited to the foregoing embodiment, but various modifications may be appropriately made.

For example, in the above embodiment, the irradiation position of the laser beam on the sample is moved by moving the sample stage (that is, the sample stage driving unit 12 is set to the irradiation position driving unit). However, the irradiation position of the laser beam on the sample may be moved by moving the laser irradiation unit 30 or changing a posture (orientation) of the laser irradiation unit 30 (that is, a laser irradiation unit driving unit that changes the position and posture of the laser irradiation unit 30 may be provided). The irradiation position driving unit may be configured to move both the sample stage and the laser beam.

In the above embodiment, when the user selects the checking region where the desired optical microscopic image is displayed from the plurality of checking regions, the position of the condensing optical system 33 corresponding to the checking region (determined checking region) is automatically set to the position at the time of the next mass spectrometry. However, the position of the condensing optical system may be manually set by the user who views the optical microscopic image 643 displayed in the checking region.

In addition, for example, the image data processor 51 may perform binarization processing on the optical microscopic image acquired by the image acquiring unit 40, extract an outline of the irradiation mark of the laser beam in the checking region 110, and calculate the diameter (irradiation diameter) of the irradiation mark from the outline. In this case, the irradiation diameter data of each checking region 110 calculated by the image data processor 51 is stored in the image data storage unit 511. The irradiation diameter data stored in the image data storage unit 511 is read together with the optical microscopic image data of each checking region 110 and displayed on the irradiation diameter checking screen. For example, the value of the irradiation diameter in the checking region may be displayed by arranging the optical microscopic images 643 of the 11 checking regions included in the irradiation diameter checking screen 642 in FIG. 3 on any one of the upper, lower, left, and right sides. In this configuration, the image data processor 51 corresponds to the irradiation diameter calculation unit.

In the above embodiment, the plurality of optical microscopic images are collectively displayed on one display screen. However, the plurality of optical microscopic images may be sequentially displayed one by one on the display screen.

[Various Aspects]

It will be understood for those skilled in the art that the exemplary embodiment described above is specific examples of the following aspects.

An imaging mass spectrometer according to a first aspect is an imaging mass spectrometer which generates ions by irradiating a sample with a laser beam and performs mass spectrometry of the ions, the imaging mass spectrometer including:

a laser irradiation unit configured to emit the laser beam toward the sample;

a condensing optical system disposed between the laser irradiation unit and the sample and configured to condense the laser beam emitted from the laser irradiation unit;

an image acquiring unit configured to acquire a condensing state checking image which is an optical microscopic image capable of checking a condensing state on the sample of the laser beam emitted from the laser irradiation unit; and a display unit configured to display the condensing state checking image acquired by the image acquiring unit on a display screen.

In the imaging mass spectrometer of the first aspect, the user can check the condensing state of the laser beam emitted from the laser irradiation unit on the sample by viewing the condensing state checking image displayed on the display screen of the display unit. At this point, the condensing state checking image includes an image in which the irradiation diameter at the irradiation position of the laser beam can be checked (for example, an image in which the outline of the irradiation mark of the laser beam is clearly illustrated), an image in which light intensity per unit area of the laser beam at the irradiation position of the laser beam can be checked (for example, an image in which the light intensity is represented by brightness), and the like.

When the condensing state checking image is an image in which the irradiation diameter can be checked, the display unit may display a scale on the display screen together with the condensing state checking image.

An imaging mass spectrometer according to a second aspect may be the imaging mass spectrometer according to the first aspect, further including an irradiation diameter calculation unit configured to calculate an irradiation diameter which is a diameter of an irradiation mark of the laser beam on the sample from the condensing state checking image acquired by the image acquiring unit, wherein the display unit is configured to display the irradiation diameter on the display screen together with the condensing state checking image.

According to the imaging mass spectrometer of the second aspect, the user can check the condensing state of the laser beam using the irradiation diameter displayed on the display screen as an index. In addition, it is possible to easily check whether the irradiation diameter of the laser beam is correctly set.

For example, a sample in which pigment is uniformly applied to the surface of a slide glass, and in irradiating the laser beam, the pigment in the irradiated region is scattered by ablation and a mark (irradiation mark) irradiated with the laser beam is formed can be used as a sample (a sample for checking the irradiation diameter) used in acquiring an image in which the irradiation diameter of the laser beam can be confirmed. In addition, for example, a sample obtained by applying a matrix used for preparing an MALDI sample to the surface of the slide glass can also be used as the sample for checking the irradiation diameter. In addition, for example, the MALDI sample (that is, the sample in which the matrix is applied on a tissue section cut out from a living tissue) can also serve as the sample for checking the irradiation diameter. In this case, a region out of the analysis target region in the MALDI sample is used to acquire an image in which the irradiation diameter can be checked.

An imaging mass spectrometer according to a third aspect is the imaging mass spectrometer according to the second aspect, wherein the condensing state checking image is an image of a non-analysis target region, which is a region deviated from a region to be subjected to the mass spectrometry, acquired by the image acquiring unit after the non-analysis target region of the sample having a surface applied with a predetermined pigment or a predetermined matrix is irradiated with the laser beam.

An imaging mass spectrometer according to a fourth aspect may be the imaging mass spectrometer according to one of the first to third aspects, further including:

a condensing optical system driving unit configured to move the condensing optical system so as to change the condensing state of the laser beam on the sample; and an irradiation position moving unit configured to move an irradiation position of the laser beam on the sample, wherein the display unit is configured to display the condensing state checking image of each of a plurality of checking regions on the sample on the display screen when the condensing optical system is irradiated with the laser beam at different positions.

In the imaging mass spectrometer of the fourth aspect, the irradiation position moving unit may move the laser beam or the sample stage. For example, moving the laser irradiation unit or changing the posture (orientation) of the laser irradiation unit such that the emission direction of the laser beam changes can be cited as a method for moving the laser beam. According to the imaging mass spectrometer described above, the user can check the position of the condensing optical system when the condensing state of the laser beam is in a desired state by viewing the condensing state checking images of the plurality of checking regions displayed on the display screen. For example, the position of the condensing optical system corresponding to the checking region in which the irradiation diameter of the laser beam is the smallest can be set to the position of the condensing optical system at the time of measurement when the highest resolution is required, and the position of the condensing optical system corresponding to the checking region in a state closest to the laser irradiation diameter can be set to the position of the condensing optical system at the time of measurement in a case of the measurement in which a predetermined laser irradiation diameter is required in relation to the sample and the measurement purpose.

An imaging mass spectrometer according to a fifth aspect may be the imaging mass spectrometer according to the fourth aspect, wherein the display unit is configured to display the condensing state checking images of the plurality of checking regions side by side on the display screen.

According to the imaging mass spectrometer of the fifth aspect, it is easy to compare the condensing states of the laser beams with which the plurality of checking regions displayed on the display screen are irradiated with each other.

An imaging mass spectrometer according to a sixth aspect is the imaging mass spectrometer according to a fifth aspect, further including:

a selection operation unit configured to allow a user to select a checking region from among the plurality of checking regions displayed on the display screen; and a position setting unit configured to set the position of the condensing optical system in the checking region selected by the selection operation unit as the position of the condensing optical system at a time of next measurement.

According to the imaging mass spectrometer of the sixth aspect, the user can easily adjust the position of the condensing optical system.

REFERENCE SIGNS LIST

11 . . . Sample Stage
100 . . . Sample
110 . . . Checking Region
12 . . . Sample Stage Driving Unit
30 . . . Laser Irradiation Unit
31 . . . Laser Beam
33 . . . Condensing Optical System
34 . . . Condensing Optical System Driving Unit
37 . . . Irradiation Controller
40 . . . Image Acquiring Unit
50 . . . Data Processor
51 . . . Image Data Processor
511 . . . Image Data Storage Unit
512 . . . Irradiation Diameter Checking Screen Production Unit
62 . . . Irradiation Diameter Checking Controller
621 . . . Position Setting Unit
63 . . . Input Unit
64 . . . Display Unit
641 . . . Display Screen
642 . . . Irradiation Diameter Checking Screen
643 . . . Optical Microscopic Image

The invention claimed is:

1. An imaging mass spectrometry method, comprising:
generating ions by irradiating a sample with a laser beam and performing mass spectrometry of the ions,
condensing the laser beam that irradiates the sample via a condensing optical system;
at least one of moving the condensing optical system so as to change a condensing state of the laser beam on the sample or moving an irradiation position of the laser beam on the sample;
acquiring a condensing state checking image, which is an optical microscopic image capable of checking the condensing state on the sample of the laser beam;
displaying the condensing state checking image a display screen;
calculating an irradiation diameter, which is a diameter of an irradiation mark of the laser beam on the sample, from the condensing state checking image and displaying the irradiation diameter on the display screen together with the condensing state checking image,
allowing a user to select the condensing state checking image that has been displayed on the display screen; and
setting the position of the condensing optical system in the selected condensing state checking image as a position of the condensing optical system at a time of next measurement.

2. The imaging mass spectrometry method according to claim 1, wherein
the condensing state checking image is an image of a non-analysis target region, which is a region deviated from a region to be subjected to the mass spectrometry, acquired after the non-analysis target region of the sample having a surface applied with a predetermined pigment or a predetermined matrix is irradiated with the laser beam.

3. An imaging mass spectrometry method, comprising:
generating ions by irradiating a sample with a laser beam at different positions and performing mass spectrometry of the ions;
condensing the laser beam that irradiates the sample via a condensing optical system;
acquiring a plurality of condensing state checking images, each of the condensing state checking images being an optical microscopic image capable of checking a condensing state on the sample of the laser beam;
at least one of moving the condensing optical system so as to change the condensing state of the laser beam on the sample or moving an irradiation position of the laser beam on the sample;
displaying the condensing state checking images on a display screen, wherein the condensing state checking images of a plurality of checking regions on the sample are displayed side by side on the display screen when the condensing optical system is irradiated with the laser beam at different positions:
allowing a user to select a checking region from among the plurality of checking regions that have been displayed on the display screen; and
setting the position of the condensing optical system in the selected checking region as the position of the condensing optical system at a time of next measurement.

* * * * *